No. 888,103. PATENTED MAY 19, 1908.
J. E. LIEBHART.
ROTARY PLOW.
APPLICATION FILED MAY 9, 1907.
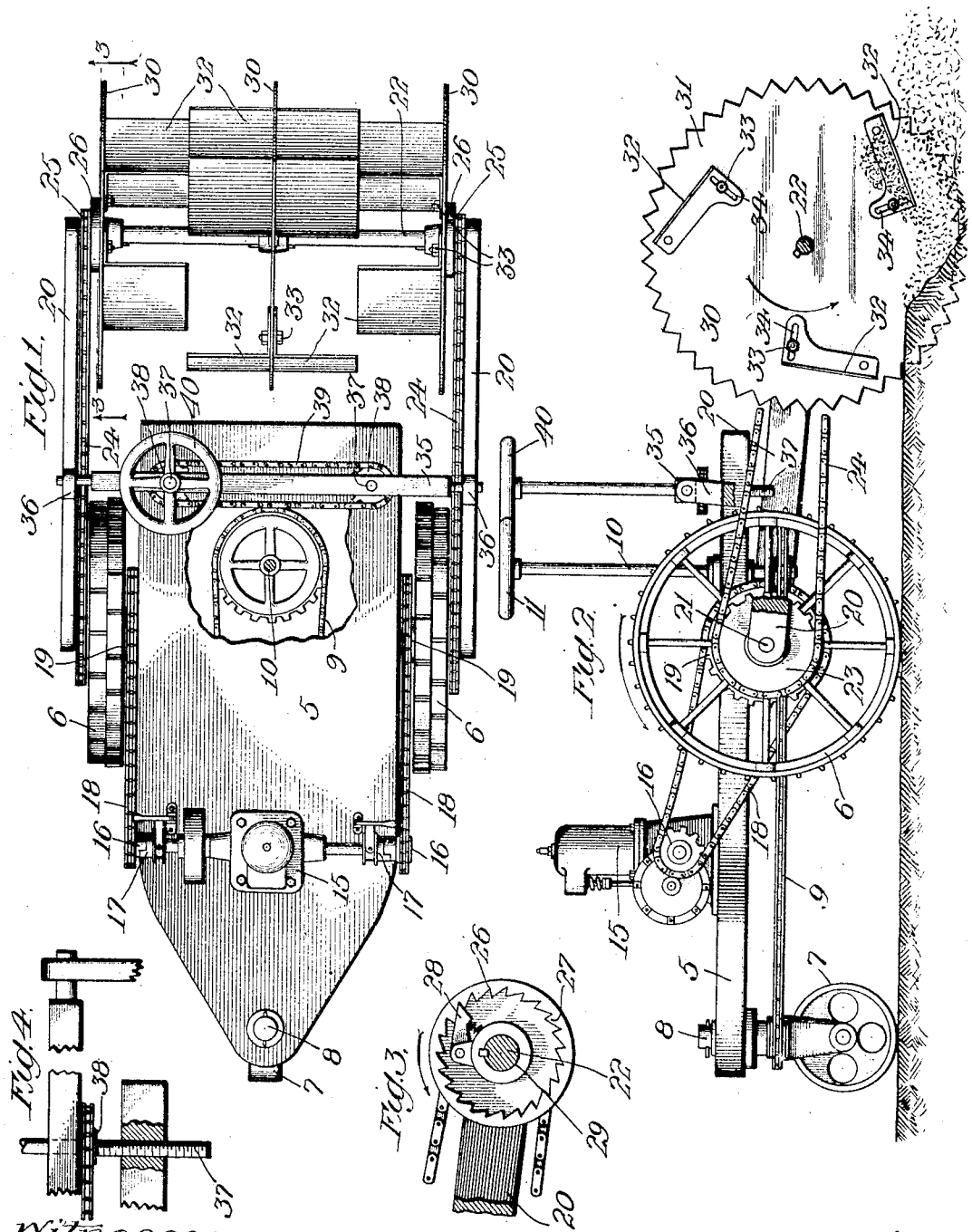
Witnesses:
Inventor:
Jacob E. Liebhart,
By Hazard & Krause
Attorneys

UNITED STATES PATENT OFFICE.

JACOB E. LIEBHART, OF TOLUCA, CALIFORNIA.

ROTARY PLOW.

No. 888,103.  Specification of Letters Patent.  Patented May 19, 1908.

Application filed May 9, 1907. Serial No. 372,695.

*To all whom it may concern:*

Be it known that I, JACOB E. LIEBHART, a citizen of the United States, residing at Toluca, in the county of Los Angeles and State of California, have invented new and useful Improvements in Rotary Plows, of which the following is a specification.

My invention relates to a power driven rotary plow which is particularly adapted to operate in soft soils; and it is the prime object thereof to provide a plow which will thoroughly loosen and completely turn over such soils.

A further object is to provide a plow which will leave a smooth and unfurrowed surface after its passage thereover.

I accomplish these objects by means of the device described herein and illustrated in the accompanying drawings, in which:—

Figure 1—is a plan view of my complete plow. Fig. 2—is a side elevation of the same as it appears in operation, parts being broken away. Fig. 3— is a detail section on line 3—3 of Fig. 1 showing the drive for the rotary shares. Fig. 4— is a detail of one of the share adjusting devices.

Referring to the drawings 5 designates a frame supported by traction wheels 6 and guide wheel 7. Guide wheel 7 is pivoted as at 8 and is connected by sprocket chain 9 to vertical shaft 10 having on its upper end hand wheel 11 by means of which the machine may be guided in the desired direction. Mounted on frame 5 is an engine 15 which I have shown as a single cylinder gasolene engine of the usual type and which carries on either end of its shaft a sprocket wheel 16 adapted to be rotatively connected with the shaft by a clutch 17. Sprocket chains 18 connect sprockets 16 to sprockets 19 secured to traction wheels 6.

The above described mechanism comprises the traction motive power for the plow and it will be manifest that by throwing one or the other of clutches 17 into engagement it is possible to drive the machine in the desired direction.

Two plow carrying bars 20 are pivoted one on either side of the machine to the outer end of traction axle 21 and extend rearwardly carrying in their rear ends a shaft 22 which is adapted to be driven in the direction shown by the arrow in Fig. 2. Sprocket wheels 23 are secured to and mounted outside each of the traction wheels 6 and are connected by sprocket chain 24 to sprocket wheels 25 on shaft 22. Formed integrally with each of sprockets 25 is a hub 26 which has on its inner periphery ratchet teeth 27 as shown in Fig. 3 and with which spring pressed pawls 28 pivotally secured to collar 29 keyed to shaft 22 are adapted to engage so that shaft 22 may be driven only in a direction indicated by the arrow. Upon any backward motion of the machine shaft 22 will not be driven from the traction wheels, but will be allowed to move independently of them. Mounted on shaft 22 and rigidly keyed thereto are a plurality of disks 30 having toothed peripheries 31 which enables them to easily cut into the soil on their rotation by the forward movement of the machine and shaft 22 is geared to rotate faster than traction wheels 6 so that disks 30 will have a cutting action on the soil rather than merely rolling over it. Each of disks 30 is provided with a number of adjustable shares 32 secured thereto which are adapted to cut into and remove portions of the soil between the cuts made by the serrated disks as the machine moves forwardly. Bolts 33 in slots 34 provide means for adjusting the shares to different soils. When a share has picked up a load of soil and rotates rearwardly its inclination increases and the soil slides off as shown in Fig. 2. In falling from the share the part of the soil which was originally on top will fall first, so as to be on the bottom in its new position.

A transverse pivoted bar 35 secured to upwardly extending arms 36 attached to plow carrying bars 20 provides means for the vertical adjustment of the rotating shares. Two vertical screw threaded rods 37 are mounted in frame 5 and are provided with sprocket wheels 38 against which transverse bar 35 rests. Sprocket wheels 38 are rotatively connected together by chain 39 so that both ends of transverse bar 35 may be raised or lowered together by the rotation of hand wheel 40 on the upper extended end of one of rods 37. By this means the depth to which the plow shares may suck into the earth is regulated to suit soils of varying hardness.

Traction wheels 6 are geared in such a ratio from engine 15 that the machine will move over the ground at a normal rate of speed. Rotary sheaves 32 are geared from traction wheels 6 so that the peripheral speed of disks 30 is enough greater than the peripheral speed of traction wheels 6 to insure of disks 30 cutting well into the soil. The soil is thus cut up into a number of strips and the shares merely remove the soil between the cuts, it not being necessary for them to tear the soil out as would be the case without the use of disks 30. Should it become necessary to move the machine rearwardly disks 30 will no longer be driven by traction wheels 6 and therefore will not cut into the soil, but will roll over the top of the soil raising bars 20 and cross bar 35. This same action will take place should the disks encounter a large boulder or other hard matter, and the shares will be raised so as not to strike such.

It will be observed that I have produced a plow which is especially applicable to soft and sandy soils where the work can be done very quickly. It will also be noted that the shares will completely overturn all the soil passed over by the machine thus working the soil to the greatest extent possible.

Having described my invention what I claim as new and desire to secure by Letters-Patent is:—

1. In a rotary plow, a frame provided with traction wheels, a motor mounted on said frame having driving connection with said wheels, a plow frame pivotally mounted on said first named frame, adjusting means for said plow frame, a plurality of disks rotatively mounted in the outer end of said plow frame, said disks being provided with serrated peripheries, soil turning shares adjustably secured to the face of said disks, and driving connection between said motor and said disks to drive said disks at a higher peripheral velocity than said traction wheels are driven and in the same direction as said traction wheels are driven.

2. In a plow, a rotary share comprising a disk provided with a serrated periphery, and soil turning shares adjustably secured to the face of said disks and projecting at right angles to the face thereof.

In witness that I claim the foregoing I have hereunto subscribed my name this 2nd day of May, 1907.

JACOB E. LIEBHART.

Witnesses:
 EDMUND A. STRAUSE,
 MYRTLE A. JONES.